United States Patent [19]
Hampton et al.

[11] Patent Number: 5,460,032
[45] Date of Patent: Oct. 24, 1995

[54] IMPOUNDMENT LEAK DETECTION, LOCATION, AND CONTAINMENT SYSTEM

[75] Inventors: Burt T. Hampton; Timothy O. Hampton, both of Magnolia, Ark.

[73] Assignee: Burt Troyce Hampton, Magnolia, Ark.

[21] Appl. No.: 949,688

[22] Filed: Sep. 23, 1992

[51] Int. Cl.⁶ .................................. G01M 3/04
[52] U.S. Cl. .................... 73/49.2; 324/557; 340/605; 405/54
[58] Field of Search ................... 324/557, 558, 324/559; 340/604, 605; 73/49.2; 405/37, 54

[56] References Cited

U.S. PATENT DOCUMENTS

| | | | |
|---|---|---|---|
| 3,383,863 | 5/1968 | Berry | 324/557 X |
| 4,430,021 | 2/1984 | Wagner et al. | 405/129 |
| 4,682,492 | 7/1987 | Green | 405/54 X |
| 4,725,785 | 2/1988 | Converse et al. | 324/559 |
| 4,740,777 | 4/1988 | Slocum et al. | 340/522 |
| 4,810,131 | 3/1989 | Turner | 405/129 |
| 4,844,840 | 7/1989 | Feizollahi | 252/633 |
| 4,867,604 | 9/1989 | Bell | 405/128 |
| 4,922,232 | 5/1990 | Bosich | 340/605 |
| 4,947,470 | 8/1990 | Darilek | 324/557 |
| 4,955,983 | 9/1990 | Meess et al. | 405/128 |
| 5,030,033 | 7/1991 | Heintzelman et al. | 405/128 |
| 5,357,202 | 10/1994 | Henderson | 324/557 |

OTHER PUBLICATIONS

Goldberg, D. "Incinerator Ash: New Problems for Landfills," *Recycling Today* (May 1988), pp. 41–42, 44, 67.
"An Added Barrier of Protection From Gundle: High Performance HDPE/Bentonite Composite Landfill Liner," Advertisement, Gundle Lining Systems, Inc., 1990.
"Sanitary Landfills," Advertisement, Gundle Lining Systems, Inc., 1990.
"The Problem of Leaking Tanks," Advertisement, Gundle Lining Systems, Inc., 1991.
"'Hyperlastic' VLDPE Lining System," Advertisement, Gundle Lining Systems, Inc., 1991.

*Primary Examiner*—Gerard R. Strecker
*Attorney, Agent, or Firm*—Richards, Medlock & Andrews

[57] ABSTRACT

An impoundment leak detection, location, and containment system comprises an impermeable grid having a plurality of leak detection modules positioned below the impoundment. A tunnel is located adjacent the impermeable grid, and a plurality of conduits provide fluid communication between each of the leak detection modules and the tunnel. Fluid leaking from the impoundment accumulates in the leak detection module directly below the leak and flows through the associated conduit where it is detected by a fluid sensor. The location of the leak is determined based on the known location of the leak detection module accumulating fluid.

15 Claims, 5 Drawing Sheets

IMPOUNDMENT LEAK DETECTION, LOCATION, AND CONTAINMENT SYSTEM

TECHNICAL FIELD

This invention relates to the containment of environmentally hazardous materials, and in particular to a system for detecting, locating, and containing a leak from an impoundment.

BACKGROUND OF THE INVENTION

Many types of impoundments are currently in use for the storage and disposal of hazardous materials. Examples include landfills, surface tanks, underground tanks, and various kinds of vault structures. A major concern regarding all impoundments containing hazardous material is the migration of the material away from the impoundment and into the environment where it can pose a significant danger to public health and safety.

To alleviate the risk of environmental contamination, government regulations require the installation (in many situations) of one or more impermeable synthetic liners, known as secondary containment systems, below landfills and many other impoundments of hazardous or potentially hazardous materials. The liners typically are large sheets of flexible, polymeric material, such as high density polyethylene, and are intended to resist degradation caused by the environment and contact with caustic hazardous waste. During construction of the impoundment, individual sheets of the liner material are seamed together at the construction site to form a continuous, impermeable liner which extends below and completely encompasses the bottom of the impoundment. Where more than one liner is used, a layer of clay or some other material having a low permeability is often placed between the liners.

Government regulations also require that the liners or secondary containment system be augmented by a number of monitoring wells at locations surrounding and adjacent to the impoundment. The purpose of the monitoring wells is to allow for the periodic testing of groundwater below the impoundment. The detection of hazardous material in the groundwater indicates a failure of the secondary containment system.

There are, however, some serious shortcomings associated with the use of synthetic liners and monitoring wells for the safe storage and disposal of hazardous waste. First, synthetic liners unfortunately have a tendency to develop leaks over time. The leaks can be caused by a number of factors such as punctures, split seams, and differential settling of the underlying soil. Once such a leak occurs, there is nothing to prevent the hazardous material from escaping the impoundment and contaminating nearby soil, surface water, and groundwater. Second, when a leak is first discovered through the detection of hazardous material in a groundwater sample taken from a monitoring well, significant damage to the environment will have already been inflicted. The hazardous waste will have already contaminated groundwater, an important source of public drinking water. Finally, the detection of hazardous waste in samples taken from the monitoring wells only reveals the existence of a leak, it provides little or no information as to the location and severity of the leak. Consequently, to correct the problem, it is necessary to remove the entire impoundment and completely replace all synthetic liners at an enormous financial cost. Such remedial measures also pose an increased danger to public health and safety because of the additional contact with the relocated hazardous waste.

Therefore, there is a need for a system which will provide early detection of a leak in an impoundment of hazardous or potentially hazardous waste materials, provide information as to the location and severity of the leak so that less extensive and less costly remedial measures may be taken, and which will safely contain the leak and prevent the escaping fluid from contaminating the environment.

SUMMARY OF THE INVENTION

The present invention is an apparatus for the detection, location, and containment of leaks from impoundments containing hazardous or potentially hazardous waste. The apparatus is designed to be installed below the synthetic liners of the impoundment's secondary containment system; however, because of the containment ability of the present invention, it may also replace one or more of those synthetic liners. Furthermore, the present invention may also be used under impoundments which include no synthetic liners, where it would serve as the sole containment system.

The impoundment leak detection, location, and containment system of the present invention is also modular, which allows the system to be inexpensively and easily enlarged as the impoundment area grows. The system will withstand many years of exposure to harsh environmental conditions. In fact, it can maintain its structural integrity and containment ability even under severe dislocations of the soil in which it is installed.

Furthermore, the apparatus of the present invention employs primarily mechanical components. Therefore, it has superior long-term reliability and will not be prone to malfunction. The present invention may also be used to extract material leaking from the impoundment for storage elsewhere, thus allowing time to plan and undertake appropriate remedial measures or, in the case of minor leaks, making remedial measures unnecessary.

The apparatus of the present invention comprises an impermeable grid which extends below the impoundment in a continuous manner. The impermeable grid further comprises a plurality of leak detection modules for collecting and localizing fluid escaping from a leak in the impoundment. A tunnel extends adjacent to the impermeable grid, and a plurality of closed conduits provide separate fluid communication between each of the leak detection modules and the tunnel. When a leak develops in the impoundment, the escaping fluid seeps downward and accumulates in the leak detection module below the leak. The fluid then travels through the conduit to the tunnel, where it can be detected by mechanical or electrical fluid sensors. Because each conduit is associated with a particular leak detection module, and since the location of each module is known in relation to the overall impoundment, it is possible to determine the location of the impoundment leak by merely identifying which conduit contains fluid. In addition, the amount of fluid within the conduit indicates the severity of the leak. Where the leak is relatively minor, the fluid may be pumped from the conduits and stored in a nearby storage tank.

BRIEF DESCRIPTION OF THE DRAWINGS

A more complete understanding of the present invention and its advantages will be readily apparent from the following Detailed Description taken in conjunction with the accompanying drawings, in which.

DETAILED DESCRIPTION

Figure 1:
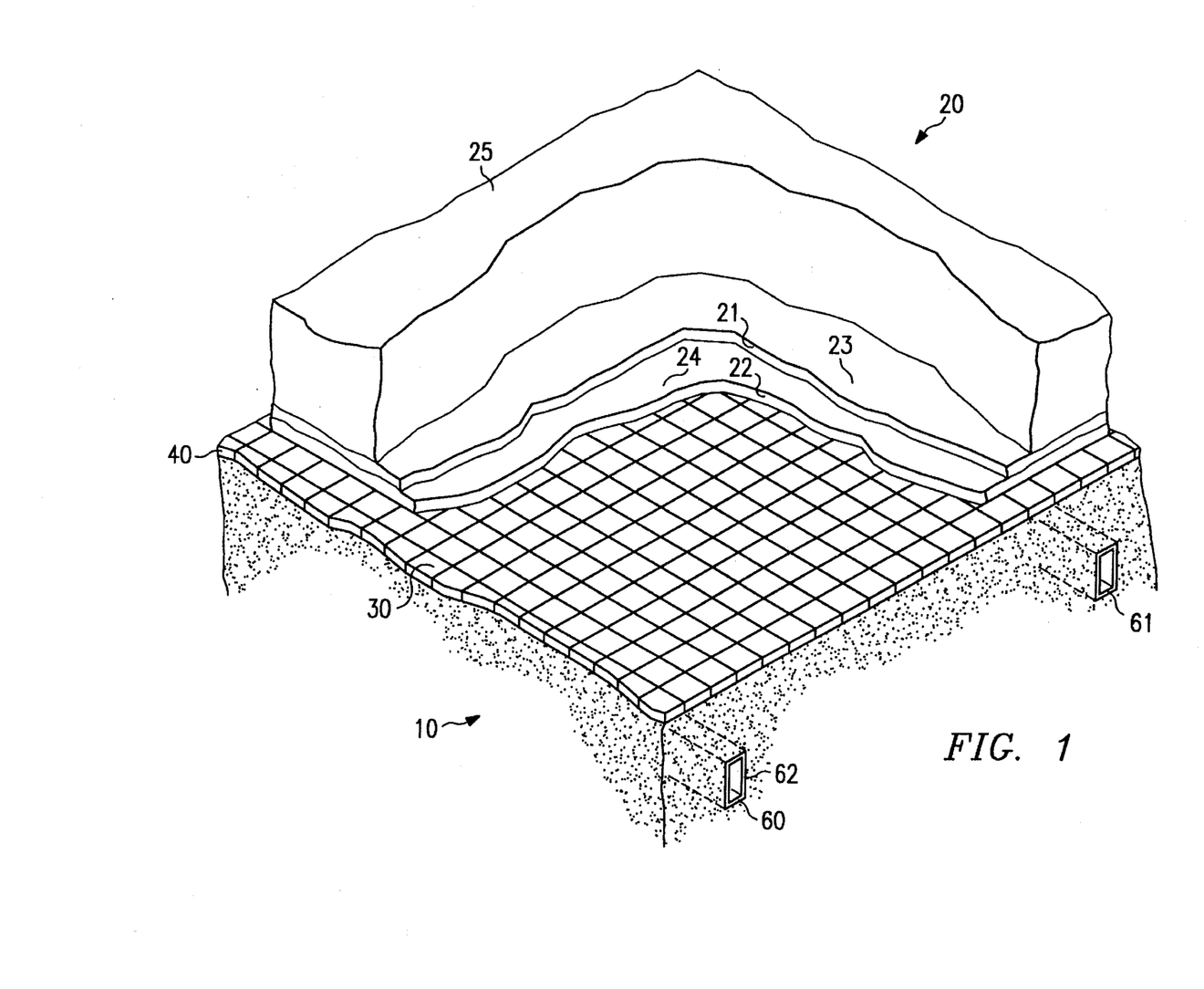
FIG. 1 is a perspective view of the present invention in place below an impoundment with portions of the impoundment removed.

The impoundment leak detection, location, and containment system of the present invention is depicted generally at 10 in FIG. 1. System 10 is designed to be installed below an impoundment containing hazardous materials or any other material which should not be allowed to migrate into the surrounding environment. For purposes of this detailed description of the present invention, system 10 is shown installed below a landfill 20. It will be understood by those skilled in the art that system 10 is not limited to use only in conjunction with landfills, but may also be successfully used with many other types of impoundments, such as surface tanks, tank farms, underground tanks and various kinds of vault structures. In fact, the present invention may be used in conjunction with any type of impoundment or containment structure which holds material that could harm the environment or pose a danger to public health or safety.

Landfill 20 comprises a first clay layer 21 and a second clay layer 22, which are each approximately one to three feet thick, depending upon the design of the particular landfill. First synthetic liner 23 lies directly above first clay layer 21. Second synthetic liner 24 lies sandwiched between first clay layer 21 and second clay layer 22. Waste heap 25 rests above first synthetic liner 23.

A portion of landfill 20 has been removed in FIG. 1 to more clearly illustrate the present invention. System 10 comprises impermeable grid 40 which extends in a continuous manner below landfill 20. Impermeable grid 40 is composed of a plurality of interconnected leak detection modules 30. As shown in FIG. 1, impermeable grid 40 is positioned such that any fluid escaping from a leak in first synthetic liner 23 and second synthetic liner 24 will seep downward due to gravitational forces and accumulate in one or more of leak detection modules 30.

Figure 2:
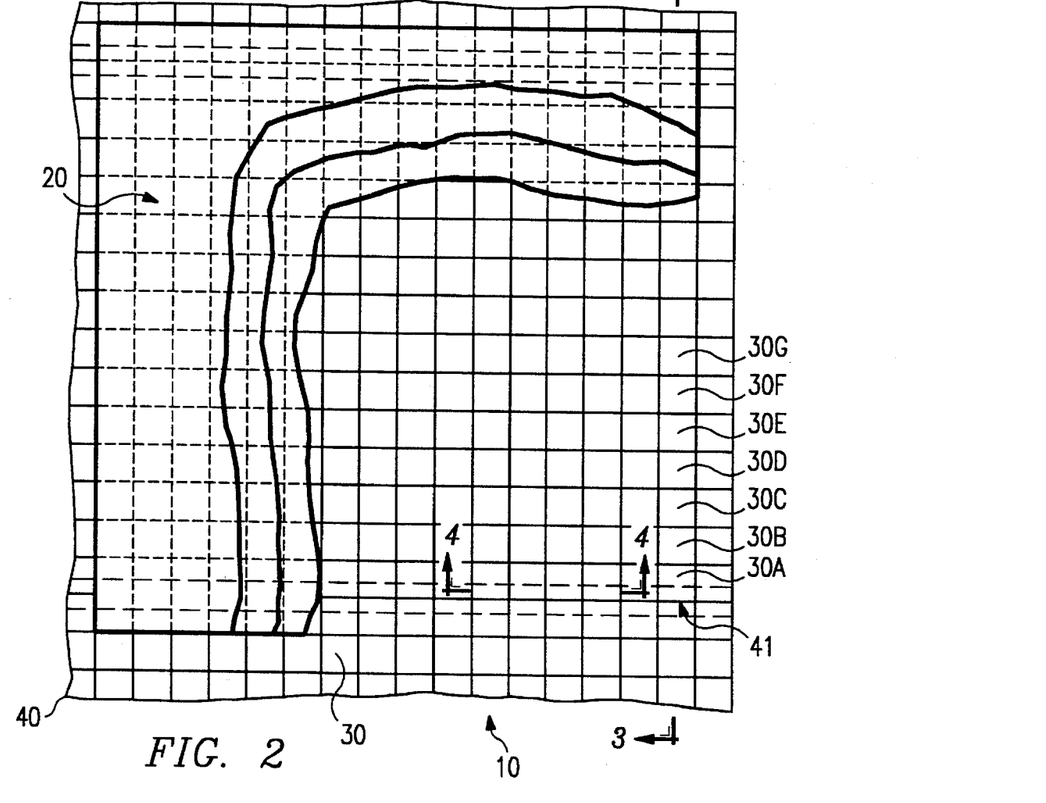
FIG. 2 is a plan view of the present invention in place below an impoundment with portions of the impoundment removed.

As shown in FIG. 2, impermeable grid 40 comprises a plurality of rows of leak detection modules 30. A typical row 41 comprises individual leak detection modules 30A–30G. Although for purposes of this description typical row 41 comprises seven leak detection modules 30, it will be understood by those skilled in the art that in actual practice row 41 is likely to comprise significantly more than that number. In fact, the exact number used in each case may be varied to accommodate the size of the landfill 20. A larger landfill 20 may require more individual leak detection modules 30 in each typical row 41. A smaller landfill 20, on the other hand, may require fewer leak detection modules 30 in each typical row 41. The number of leak detection modules 30 may also vary because the dimensions of each individual impoundment may be larger or smaller based on the impoundment designer's choice.

Adjacent rows of leak detection modules 30 are connected to form impermeable grid 40. Several embodiments for the connection of adjacent rows of leak detection modules 30 are described below.

Alternatively, impermeable grid 40 may be formed from a single sheet of material. During fabrication of impermeable grid 40, a plurality of uniformly spaced concave portions may be formed in a sheet of material using fabrication methods known to those skilled in the art. The concave portions would function as leak detection modules 30. Stainless steel and polymeric materials, such as high density polyethylene, are suitable materials for constructing impermeable grid 40 from a single sheet. However, it will be apparent to those skilled in the art that other materials offering the properties of formability, strength, and corrosion resistance would be suitable as well.

Figure 3:
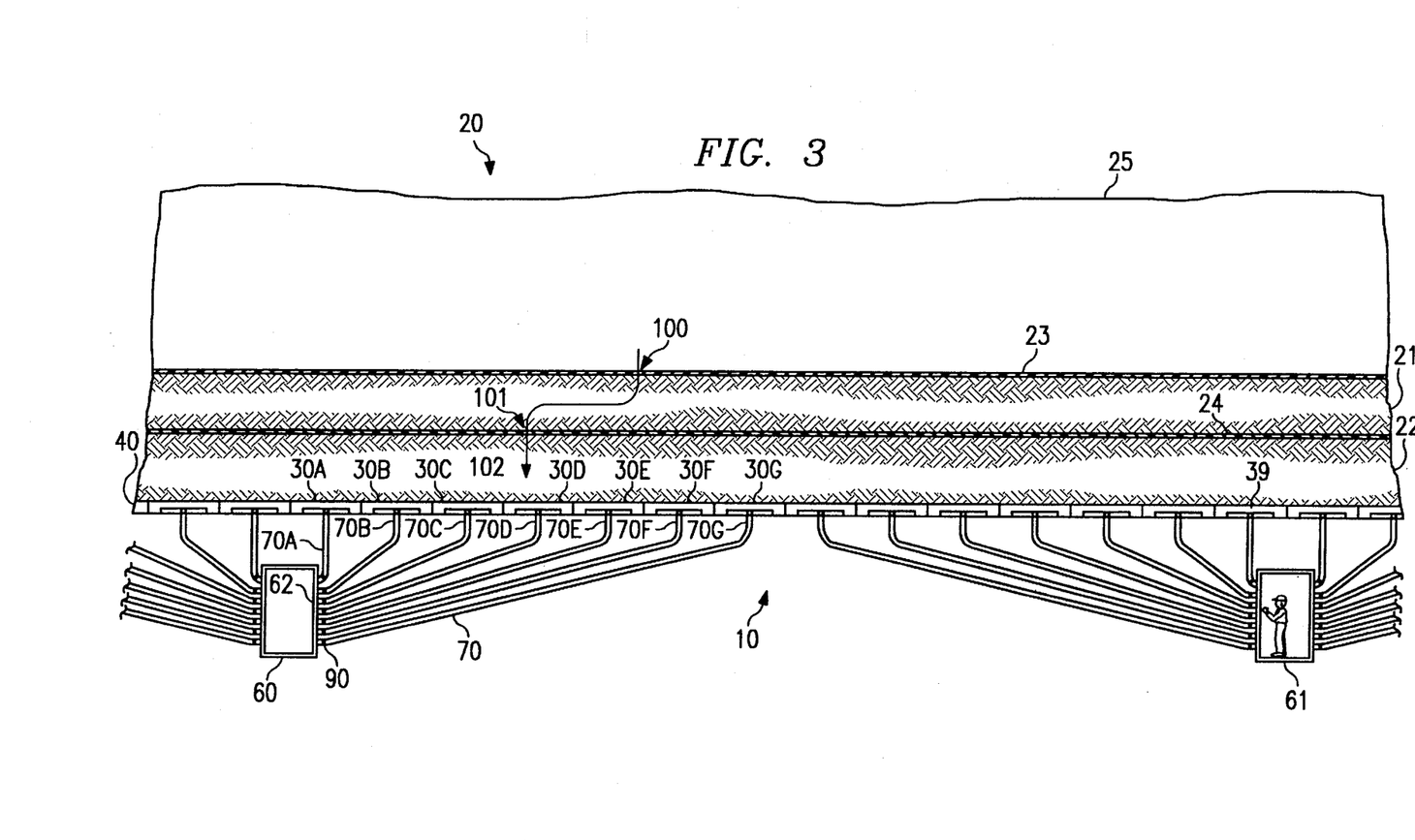
FIG. 3 is a cross-sectional elevation view of the present invention along the line 3—3 of FIG. 2.

Referring now to FIG. 3, it may be seen that impoundment leak detection, location, and containment system 10 further comprises tunnel 60. In the embodiment shown in FIG. 3, tunnel 60 is positioned below impermeable grid 40 and extends horizontally in a direction generally perpendicular to the rows of leak detection modules 30. Tunnel 60 may be constructed from concrete, steel, or any other material or method of construction known in the art to be suitable for underground tunnels.

Alternatively, tunnel 60 may be constructed so that it has a generally vertical orientation and extends downward into the ground. Because of the vertical orientation, tunnel 60 would be positioned adjacent rather than below impermeable grid 40. In addition, a plurality of vertically oriented tunnels 60 may be positioned around the periphery of impermeable grid 40.

A plurality of closed conduits 70 provide closed fluid communication between leak detection modules 30 and tunnel 60. A separate conduit 70 is connected to each leak detection module 30. For example, in typical row 41, conduits 70A–70G are connected to leak detection modules 30A–30G, respectively. Additional conduits 70 are connected to each leak detection module 30 of each row of impermeable grid 40, such that separate, closed fluid communication exists between each leak detection module 30 and tunnel 60.

Figure 4:
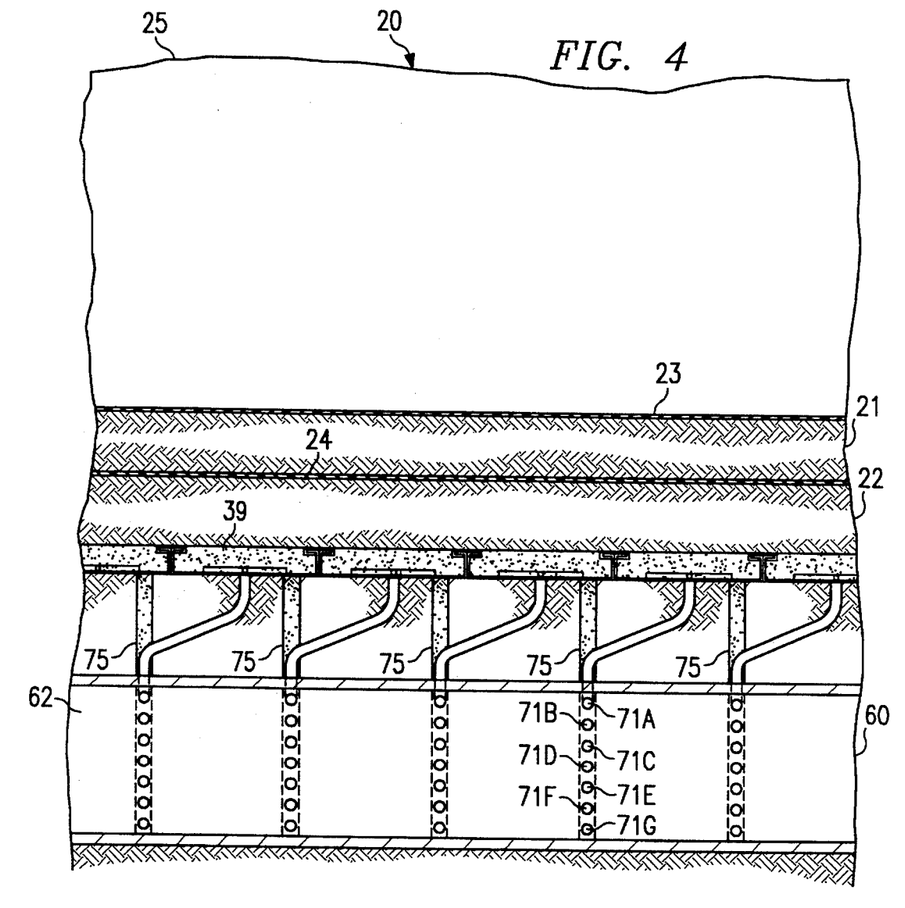
FIG. 4 is a cross-sectional elevation view of the present invention along the line 4—4 of FIG. 2.

As shown in FIG. 4, associated with each row of leak detection modules is a trench 75, which extends generally parallel to each row of leak detection modules 30 and generally perpendicular to tunnel 60. Trench 75 is shown beside each row of leak detection modules in FIG. 4; however, the placement of trench 75 with respect to each row of leak detection modules is not critical. The depth of trench 75 is approximately the same as the depth of the bottom of tunnel 60. For each typical row 41, trench 75 contains individual conduits 70A–70G as they extend from individual leak detection modules 30A–30G to tunnel 60. Trench 75 thus arranges conduits 70A–70G in a generally vertical fashion, with the conduit connected to the leak detection module farthest from tunnel 60 occupying the lowest position within trench 75, although other arrangements of conduits 70A–70G would be within the scope of the present invention. Those conduits connected to leak detection modules 30 nearer to tunnel 60 occupy progressively higher positions, and the conduit connected to the leak detection module nearest to tunnel 60 occupies the top position within trench 75. The remainder of trench 75 is filled with soil or any suitable material to provide additional support for conduits 70 and impermeable grid 40.

The ends of conduits 70 project through the sidewall 62 of tunnel 60, as indicated in FIG. 4, in order to provide access to conduits 70 from the inside of tunnel 60. For example, ends 71A–71G of conduits 70A–70G are arranged in a generally vertical fashion on sidewall 62. The end of the conduit connected to the leak detection module 30 nearest tunnel 60 is positioned at the top. The ends of the conduits connected to leak detection modules 30 progressively farther away from tunnel 60 are positioned progressively lower on the sidewall. Although this particular arrangement is preferred, other arrangements are within the scope of the present invention. There must, however, be some way to determine which conduit 70A–70G is connected to each particular leak detection module 30A–30G within each typical row 41. That may be accomplished by arranging ends 71A–71G as described above. Alternatively, ends 71A–71G could be arranged differently and labeled to show which conduit 70A–70G is connected to each particular leak detection module 30A–30G.

Figure 5:
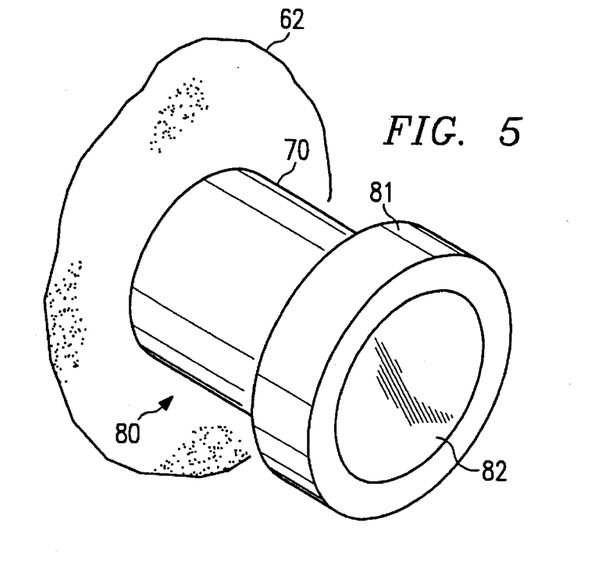
FIG. 5 is a perspective view showing a first embodiment of a fluid sensor.

System 10 further comprises a plurality of fluid sensors which indicate the presence of fluid within leak detection modules 30 or conduits 70. Shown generally at 80 in FIG. 5 is a first embodiment of a fluid sensor. Fluid sensor 80 is positioned on the ends, such as ends 71A–71G, of conduits 70 which project through the sidewall 62 of tunnel 60. Fluid sensor 80 comprises cap 81 which is mounted to the end of each conduit 70. Cap 81 further comprises transparent portion 82 which allows the visual inspection of the interior of conduits 70. Thus, by merely looking through transparent portion 82 of fluid sensor 80 from the interior of tunnel 60, it is possible to determine whether fluid is present within conduits 70.

Figure 6:
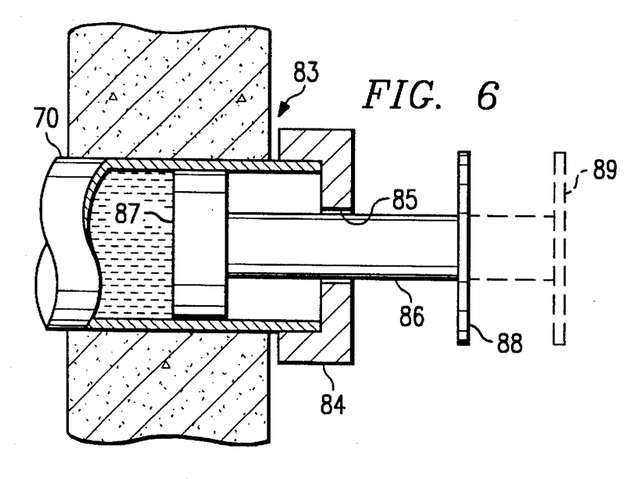
FIG. 6 is a side view showing a second embodiment of a fluid sensor.

FIG. 6 shows a second embodiment of a fluid sensor, depicted generally at 83, for indicating the presence of fluid within conduits 70. Fluid sensor 83 comprises cap 84 mounted to the ends, such as ends 71A–71G, of conduits 70 which project through the sidewall 62 of tunnel 60. Cap 84 contains centrally located aperture 85 through which passes rod 86. Piston 87 is disposed on the end of rod 86 inside conduit 70. Flange 88 is disposed at the opposite end of rod 86. When fluid is present within conduit 70, it will exert an increased pressure upon piston 87. That pressure will cause rod 86 to travel outwardly until flange 88 occupies position 89. Thus, the presence of fluid within conduits 70 may easily be determined by visually inspecting fluid sensors 83 from within tunnel 60. When fluid is present within a particular conduit 70, flange 88 will be in position 89.

Alternatively, as indicated in FIG. 3, electrical fluid sensors 90 may be used to indicate the presence of fluid within conduits 70 or leak detection modules 30. Electrical fluid sensors 90 may be located at any point within conduits 70 and electrically connected to a conveniently located display system (not shown). In addition, electrical fluid sensors 90 may be positioned inside leak detection modules 30. Where the electrical fluid sensors 90 are utilized inside leak detection modules 30, system 10 will function effectively even without conduits 70 and tunnel 60. Electrical fluid sensors 90 may be any electrical sensors known to those skilled in the art which produce an electrical signal upon contact with fluid.

Figure 7:
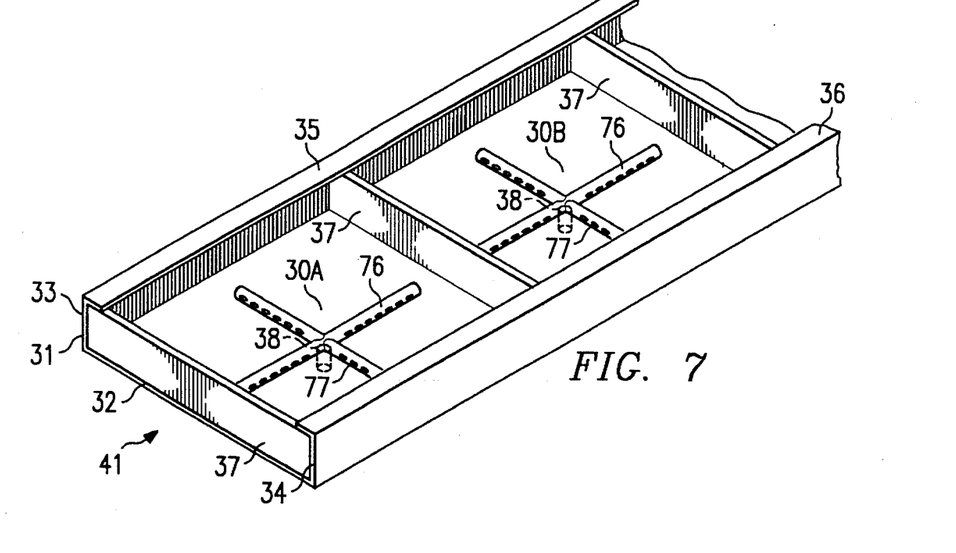
FIG. 7 is a perspective view showing two leak detection modules of the present invention.

A more detailed view of a portion of a typical row 41 of leak detection modules 30 is shown in FIG. 7. Typical row 41 may be fabricated from a single, flat sheet of material which is formed into the shape of channel 31 by a conventional roll-forming machine. Where leak detection modules 30 having larger dimensions are desired, two or more sheets of material may be joined together prior to roll-forming. Stainless steel is a suitable material for channel 31; however, other materials known to those skilled in the art as offering the properties of strength, malleability, and corrosion resistance may also be used. In addition, leak detection modules 30 may be constructed from a polymeric material, such as high density polyethylene.

Channel 31 has a generally C-shaped cross section which is open at the top and comprises bottom 32, sides 33 and 34, and connection flanges 35 and 36. Module dividers 37 are positioned transversely within channel 31 at uniform distances to form individual leak detection modules 30A and 30B. Each leak detection module 30 is substantially concave and well suited for collecting and accumulating fluid.

Each leak detection module 30 additionally comprises an aperture 38 positioned in bottom 32. Conduit 70 extends through aperture 38 and is connected to drain assembly 76. Drain assembly 76 rests on bottom 32 and comprises two conduits which are arranged in the general shape of a cross. A plurality of holes 77 are located along the lower surfaces of drain assembly 76, such that fluid present within leak detection modules 30 may enter drain assembly 76 through holes 77 and then travel to conduit 70. However, solid material which is too large to pass through holes 77 cannot enter drain assembly 76.

In addition, as shown in FIGS. 3 and 4, the leak detection modules 30 may be filled with a filtering substance 39 to remove debris and particulate matter from fluid before it enters conduits 70, where it could cause blockage. Sand, gravel, and aggregate are suitable for use as filtering substance 39, as well as any other material which can perform the function of filtering.

Figure 8:
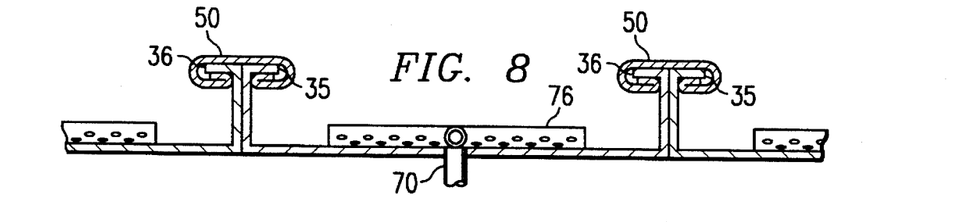
FIG. 8 is a cross-sectional view showing a first embodiment of a connector for joining adjacent leak detection modules.
Figure 9:
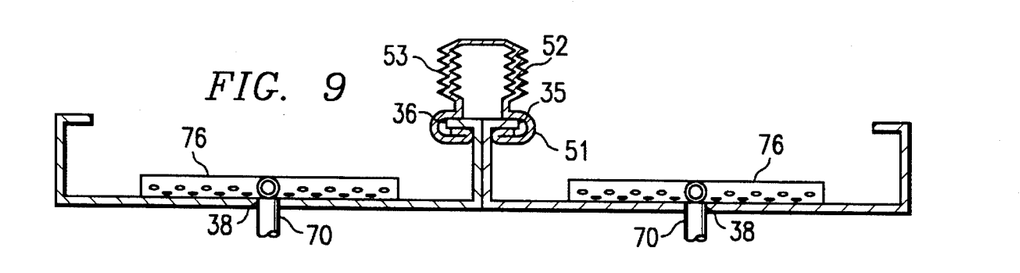
FIG. 9 is a cross-sectional view showing a second embodiment of a connector for joining adjacent leak detection modules.
Figure 10:
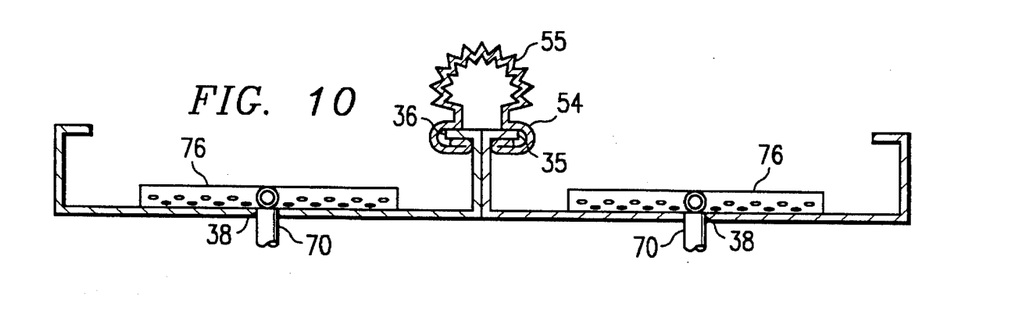
FIG. 10 is a cross-sectional view showing a third embodiment of a connector for joining adjacent leak detection modules.

FIGS. 8, 9, and 10 respectively show three different embodiments of connectors for joining adjacent rows of leak detection modules 30 to form impermeable grid 40. The first embodiment, shown in FIG. 8, comprises rigid connector 50, which is a long strip of malleable material tightly formed around flanges 35 and 36 of adjacent rows of leak detection modules 30. Rigid connector 50 is applied at the construction site and prevents all movement between adjacent leak detection modules 30.

The second embodiment, shown in FIG. 9, comprises partially flexible connector 51. Like rigid connector 50, partially flexible connector 51 is formed around connection flanges 35 and 36 of adjacent leak detection modules 30. However, partially flexible connector 51 also comprises corrugated portions 52 and 53. Due to the vertical orientation of corrugated portions 52 and 53, relative movement is permitted between adjacent leak detection modules 30 in the vertical direction.

The third embodiment is shown in FIG. 10 and comprises fully flexible connector 54 which is also formed around connection flanges 35 and 36. Fully corrugated portion 55 extends between connection flanges 35 and 36, thereby allowing relative movement in the vertical and horizontal directions between adjacent leak detection modules 30.

Each of the three embodiments shown in FIGS. 8, 9, and 10 provides a secure, impermeable connection and prevents fluid from seeping downward between adjacent leak detection modules 30.

System 10 is modular and may easily be expanded over time to accommodate growth in the size of landfill 20. As indicated in FIG. 3, rows of leak detection modules 30 and cooperating conduits 70 can extend perpendicularly in both directions from tunnel 60. System 10 may also be expanded by the addition of a second tunnel 61 along with its cooperating leak detection modules 30 and conduits 70. System 10 may be further expanded in the direction perpendicular to tunnel 60 by the addition of more tunnels, leak detection modules, and conduits. Finally, as may be seen in FIG. 4, system 10 may be expanded in the direction parallel to tunnel 60 by simply fabricating additional rows of leak detection modules 30 and connecting them to impermeable grid 40.

The operation of the impoundment leak detection, location, and containment system of the present invention will next be described with reference to FIG. 3. When a first defect 100, such as a rip or puncture, occurs in first synthetic liner 23, fluid 102 will escape through first synthetic liner 23 and seep downward through first clay layer 21 due to the operation of gravitational forces. Where a second defect 101 occurs in second synthetic liner 24, fluid 102 will continue to seep downward through second clay layer 22. Without the use of the present invention, fluid 102 escaping from landfill 20 would then be completely free to contaminate nearby soil and groundwater.

However, with the present invention installed below landfill 20, fluid 102 will be contained by impermeable grid 40. Specifically, as fluid 102 seeps downward through second clay layer 22, it will be collected in one or more leak detection modules 30, such as leak detection module 30D in FIG. 3, which are positioned below second defect 101. Leak detection module 30D prevents the further uncontrolled seepage of fluid 102 into the environment. In addition, leak detection module 30D localizes the accumulation and collection of fluid 102 near the location of defect 101. Fluid 102 then passes through filtering substance 39 contained within leak detection module 30D and flows freely downward and laterally through closed conduit 70D, until it is stopped at end 71D (FIG. 4) inside tunnel 60. The presence of fluid 102 within conduit 70D is then clearly indicated by fluid sensors 80, 83, or 90, depending upon which embodiment happens to be installed on system 10.

The presence of fluid 102 within leak detection module 30D or conduit 70D indicates a leak has occurred in the impoundment. However, the present invention also provides information concerning the location of the leak. Each conduit 70 is connected to a single leak detection module 30. In addition, the location of each leak detection module 30 is known with respect to the overall impermeable grid 40 and with respect to landfill 20. Thus, when fluid 102 is found within conduit 70D, it is known that leak detection module 30D, the one connected to conduit 70D, is collecting fluid 102. Since the location of leak detection module 30D is known, the location of defect 101 is also known because it will be directly above module 30D. Although defect 100 in first synthetic liner 23 will not necessarily be directly above leak detection module 30D, by knowing the location of defect 101 in second synthetic liner 24 it will be much easier to find defect 100. This could be accomplished by following the moisture inside first clay layer 21 to its source, which would be defect 100. Of course, where landfill 20 comprises only a single synthetic liner or where landfill 20 comprises no synthetic liners, system 10 will provide exact information concerning the location of all leaks in the impoundment.

An additional advantage of the present invention is that it may be used to extract and store the fluid 102 escaping from the impoundment. An additional conduit (not shown) may be connected to end 71D inside tunnel 60 and extend to a separate storage tank (not shown) located nearby. In this manner, fluid 102 may be safely extracted and stored, which will provide time to plan and undertake the appropriate remedial measures. Furthermore, if the leak is relatively small, as indicated by the amount of fluid extracted, it may be unnecessary to take any remedial measures, since the present invention completely contains the escaping fluid 102 and prevents it from contaminating the environment.

The present invention will also maintain its structural integrity and containment ability even during periods of severe dislocations of the soil in which it is installed. This is possible through the use of the flexible junctions shown in FIGS. 9 and 10. A severe dislocation of the soil will cause relative movement between adjacent leak detection modules 30. That movement presents the risk of a structural failure at the point of connection. However, partially flexible connector 51 and fully flexible connector 54 both accommodate relative movement between adjacent leak detection modules 30. Therefore, relative movement will not cause structural failure and any fluid 102 escaping from the impoundment will be contained by the present invention.

Although the preferred embodiment of the present invention has been described in the foregoing detailed description and illustrated in the accompanying drawings, it will be understood that the invention is not limited to the embodiments disclosed, but is capable of numerous rearrangements, modifications, and substitutions of parts and elements without departing from the spirit and scope of the invention. The present invention is therefore intended to encompass such rearrangements, modifications, and substitutions of parts and elements. For example, if desired, conduits 70 could be eliminated and electrical fluid sensors 90 installed in each leak detection module 30. In addition, each leak detection module 30 could be constructed individually and connected to impermeable grid 40 one at a time during installation. Furthermore, impermeable grid 40 may be fabricated from a single large sheet of material having a plurality of uniformly spaced concave portions functioning as leak detection modules 30.

What is claimed is:

1. An impoundment leak detection, location, and containment system, comprising:

an impoundment for containing a material including a fluid;

a plurality of leak detection modules positioned below the impoundment, said plurality of leak detection modules being connected together to form an impermeable grid which is positioned below the impoundment and extends in a continuous manner so that any fluid escaping from a leak in the impoundment moves downwardly due to gravitational force and is collected and localized within one or more leak detection modules positioned below the leak, the location of each leak detection module being known in relation to the impoundment;

a tunnel;

a plurality of fluid sensors visually accessible from inside said tunnel;

a plurality of closed fluid conduits, each of said plurality of closed fluid conduits being connected to a respective one of said plurality of leak detection modules and to a respective one of said plurality of fluid sensors so that the respective fluid sensor has a known association with the respective one of said plurality of leak detection modules to provide separate closed fluid communication between the respective one of said plurality of leak detection modules and the respective one of said plurality of fluid sensors so that any fluid which is collected and localized within a leak detection module passes from the respective leak detection module through the respective closed fluid conduit connected thereto to the associated fluid sensor;

whereby an indication by a fluid sensor of the presence of fluid at the respective fluid sensor provides an identification of the location of the associated leak detection module which collected the fluid from the leak in the impoundment and thus provides an identification of the location of the leak in the impoundment.

2. An impoundment leak detection, location, and containment system in accordance with claim 1, wherein said impoundment is a landfill containing hazardous materials.

3. An impoundment leak detection, location, and containment system in accordance with claim 1, wherein said plurality of leak detection modules comprises a sheet of material having a plurality of uniformly spaced concave portions formed therein, each concave portion functioning to collect and localize any fluid leaking from the impoundment.

4. An impoundment leak detection, location, and containment system in accordance with claim 1, wherein said plurality of leak detection modules comprises a plurality of rows, each row being fabricated from a single sheet of material and having a plurality of concave portions.

5. An impoundment leak detection, location, and containment system in accordance with claim 4, wherein adjacent rows are connected together by a rigid connector so as to prevent movement between adjacent leak detection modules.

6. An impoundment leak detection, location, and containment system in accordance with claim 4, wherein adjacent rows are connected together by a flexible connector so as to permit some relative movement between adjacent leak detection modules.

7. An impoundment leak detection, location, and containment system in accordance with claim 1, wherein each of said plurality of leak detection modules is an individual module, and wherein adjacent leak detection modules are connected to each other to form the impermeable grid.

8. An impoundment leak detection, location, and containment system in accordance with claim 7, wherein adjacent leak detection modules are connected together by a rigid connector so as to prevent movement between adjacent leak detection modules.

9. An impoundment leak detection, location, and containment system in accordance with claim 7, wherein adjacent leak detection modules are connected together by a flexible connector so as to permit some relative movement between adjacent leak detection modules.

10. An impoundment leak detection, location, and containment system in accordance with claim 1, wherein each leak detection module contains a filtering substance to remove debris and particulate matter from fluid before the fluid enters the fluid conduit connected to the respective leak detection module.

11. An impoundment leak detection, location, and containment system in accordance with claim 1, wherein each of said plurality of conduits has an end which projects through a wall of said tunnel, and wherein each fluid sensor is positioned in said tunnel in association with the projecting end of a respective fluid conduit.

12. An impoundment leak detection, location, and containment system in accordance with claim 11, wherein the portion of said tunnel into which said ends of the plurality of fluid conduits project is positioned below said grid.

13. An impoundment leak detection, location, and containment system in accordance with claim 12, wherein each of said sensors comprises a cap on the projecting end of the associated conduit, each cap having a transparent portion which allows visual inspection of the interior of the associated conduit.

14. An impoundment leak detection, location, and containment system in accordance with claim 12, wherein each of said sensors comprises a cap on the projecting end of the associated conduit, each cap having a piston which is moved by the presence of fluid in the associated conduit so as to provide a visual indication of the presence of fluid in the associated conduit.

15. An impoundment leak detection, location, and containment system in accordance with claim 1, wherein each of said sensors comprises an electrical fluid sensor which provides an electrical signal when fluid is present in the associated conduit.

* * * * *